C. B. SMITH.
COMPUTING CHART.
APPLICATION FILED AUG. 12, 1921.
1,402,803.
Patented Jan. 10, 1922.
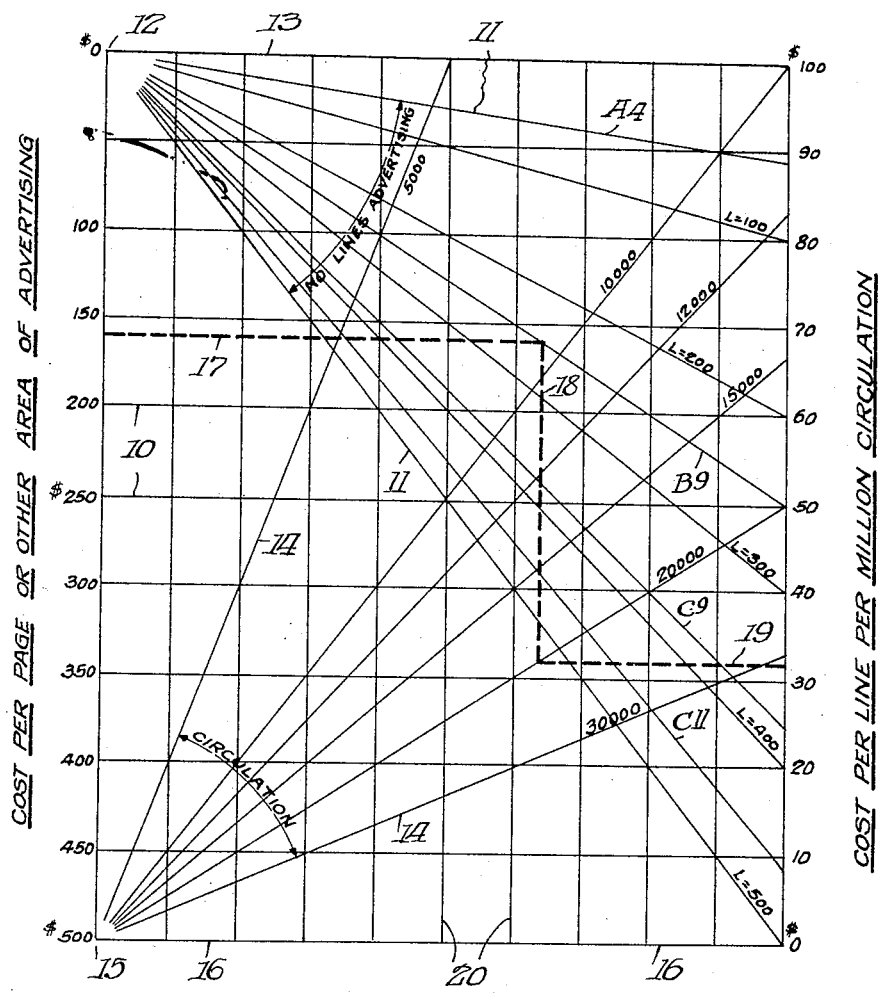
Inventor:
Cedric B. Smith,
By Fisher Towle Clapp & Soans
attys.

UNITED STATES PATENT OFFICE.

CEDRIC B. SMITH, OF CHICAGO, ILLINOIS.

COMPUTING CHART.

1,402,803. Specification of Letters Patent. Patented Jan. 10, 1922.

Application filed August 12, 1921. Serial No. 491,674.

*To all whom it may concern:*

Be it known that I, CEDRIC B. SMITH, a citizen of the United States, residing at Chicago, in the county of Cook and State of Illinois, have invented certain new and useful Improvements in Computing Charts, of which the following is a specification.

My invention relates to improvements in computing charts and has particular reference to means for graphically determining an unknown quantity from a given value of a known quantity, the relative values of which are controlled by two or more factors.

The principal objects of my invention are to provide an improved chart of the general character specified which chart may be readily used by the unskilled or by those having little knowledge of mathematics; to provide a chart which shall be well within the limits of practical accuracy for the work intended; to provide a chart which may readily be adapted for different scales and which may be suited to a wide range of usefulness, and in general to provide an improved efficient computing chart of the character referred to.

In the drawing I have illustrated my invention as applied to a chart for graphically determining or computing advertising cost per unit of space per unit of circulation. In said drawing the figure is a plan view of said chart.

Referring to the drawing, it will be observed that the area of the chart is inscribed with two sets of parallel guide lines, in the present instance one set being horizontal and the other set being vertical. The horizontal guide lines 10 in this case perform a double function of serving as guide lines both for the known quantity values and for the unknown quantity values which are to be determined.

In the particular embodiment shown the known values, at the left of the chart, which represent costs in dollars per issue per page of advertising in a daily, weekly, monthly or other publication, range from zero at the top of the scale to $500 at the bottom of the scale, the intermediate values being uniformly spaced according to an arithmetical progression and according to the uniform spacing of the parallel guide lines 10.

The unknown value scale is arranged at the right hand side of the chart and in the present case represents cost per line per million circulation, which is a standard unit in the publishing business for comparing advertising costs. These values of unit cost are also arranged in a regular arithmetical progression and for convenience are spaced to correspond with the spacing of the uniformly spaced horizontal guide lines 10. It will be observed that the zero of the unknown quantity scale is diagonally opposite to the zero of the known quantity scale at the left of the chart.

The cost per standard unit of advertising where the cost per page is known is determined or controlled in accordance with the circulation of the periodical and the number of "lines" in, or page-size of, the periodical. In view of the fact that a standard line is 1/14 of an inch in height and usually very close to 2 inches in length, a "line" is ordinarily considered to be a standard measurement of the advertising area. Hence, if the net length or depth of the page of the periodical and the number of columns be known, it is a simple matter to compute the number of "lines" for a page. In practicing my invention this computation is not required for the reason that I may employ curves or lines which actually represent, and are designated by, the sizes of pages ordinarily used for periodical purposes. For instance, A-4 would represent a page of one-column width having a net space depth of four inches and a line designated C-11 would represent a three-column page eleven inches in depth. It may also be convenient to have additional lines or curves representing even hundreds of lines.

The curves 11 which represent page sizes or quantities of lines are in the present instance straight and all converge towards a common origin or focus 12 which intersects the horizontal guide line 13 corresponding with the zero value of page cost. It will be noticed that said page size curves are inscribed on the chart in such a way as to intersect the page cost guide lines 10.

Somewhat similar curves 14 are inscribed on the chart to represent circulation or number of readers and said lines extend upwardly from a common focus or origin 15, which origin is intersected by the guide line 16 representing zero cost per standard unit of advertising, i. e., cost per "line" per million circulation. These circulation value lines extend upwardly from the origin 15 and also intersect the guide lines 10 representing page cost and unit cost. In view of the fact that a smaller page size makes the advertising per unit more expensive, it will be seen that the page size curves are arranged in a descending positive progression, whereas the unit cost scale is arranged in an ascending positive progression. Also since high circulation reduces the advertising cost per unit, the higher values of circulation are represented by the circulation curves which are closer to the origin line 16 than the circulation lines of less value.

The chart is used as follows. Assume that the advertiser is quoted a price of $160. per page and is advised that the page size of the particular publication is question is B-9, that is to say, two columns each nine inches in depth, and that the circulation is 20,000. To determine the cost per line per million circulation, which is the standard unit employed for comparing advertising costs, a line 17 is drawn horizontally from the value $160 on a page cost scale until it intersects the curve designated B-9 (252 lines). From said intersection a line 18 is then drawn vertically or at right angles to the $160 line 17 until said vertical line 18 intersects the circulation curve designated 20,000. From said point of intersection a line 19 is then drawn horizontally to intersect the right hand or cost-per-unit scale, the point of said last intersection corresponding to the standard unit cost which was to be determined, being in the stated example $31.74.

The horizontal guide lines 10 and the sets of vertical guide lines 20 are inscribed on the chart for convenience only, so as to facilitate the use of the chart and to render it unnecessary actually to draw the lines 17, 18 and 19 which intersect the factor curves. Also it will be understood that the transfer lines 17, 18 and 19 need not necessarily be actually drawn on the chart for the reason that the horizontal guide lines 10 and 20 are usually placed close enough together to permit of the computation to be effected merely by inspection.

The described details of the chart and manipulation thereof being merely illustrative of a single application of my invention, it will be understood that the scope of the invention should be determined by the appended claims, said claims being construed as broadly as possible consistent with the state of the art.

I claim as my invention:

1. A computing device comprising a sheet having inscribed thereon a scale of different values of a known quantity uniformly spaced according to an arithmetical progression, a series of curves each representing a different value of a known factor and capable of being intersected by a set of parallel lines drawn from said known quantity values, a scale of unknown quantity values also uniformly spaced according to an arithmetical progression and to which a series of parallel lines may be drawn across the sheet, and another series of curves each representing a different value of another factor and capable of being intersected by said last mentioned parallel lines, said scales and set of curves being suitably located whereby guide lines may be drawn from the zone of intersection of the first set of parallels with the first set of curves to the zone of intersection of the second set of parallels with the second set of curves.

2. A computing device comprising a sheet having inscribed thereon a scale of different values of a known quantity uniformly spaced according to an arithmetical progression, a series of curves each representing a different value of a known factor and capable of being intersected by a set of parallel lines drawn from said known quantity values, a scale of unknown quantity values parallel with the first scale and also uniformly spaced according to an arithmetical progression and to which a series of parallel lines may be drawn across the sheet, and another series of curves each representing a different value of another factor and capable of being intersected by said last mentioned parallel lines, said curves being suitably located whereby lines parallel with said scales may be drawn from the zone of intersection of the first set of parallels with the first set of curves to the zone of intersection of the second set of parallels with the second set of curves, the factor curves of each series having a common focus represented by the zero of one of said progressions.

3. A computing device comprising a sheet having inscribed thereon a linear scale of different values of a known quantity uniformly spaced according to an arithmetical progression, a series of curves each representing a different value of a known factor and capable of being intersected by a set of parallel lines drawn from said known quantity scale values, a linear scale of unknown quantity values parallel with the first scale and also uniformly spaced according to an arithmetical progression and to which also a series of parallel lines may be drawn across the sheet, and parallel with the first set of parallels, and another series of curves each representing a different value of another factor and capable of being intersected by said last mentioned parallel lines, said scales being suitably located whereby guide lines parallel with said linear scales may be drawn from the zone of intersection of the first set of parallels with the first set of curves to the zone of intersection of the second set of parallels with the second set of curves, the factor curves of each series being straight and having a common focus, the two foci being located at the zero values of the two progressions.

CEDRIC B. SMITH.